United States Patent
Robertson, Jr. et al.

(10) Patent No.: US 11,073,027 B2
(45) Date of Patent: Jul. 27, 2021

(54) MOLD TOOL AND METHODS FOR AIRFOIL BONDING

(71) Applicant: UNITED TECHNOLOGIES CORPORATION, Farmington, CT (US)

(72) Inventors: Thomas J. Robertson, Jr., Glastonbury, CT (US); Carney R. Anderson, East Haddam, CT (US); Peter T. Schutte, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 34 days.

(21) Appl. No.: 15/982,648

(22) Filed: May 17, 2018

(65) Prior Publication Data

US 2019/0353040 A1 Nov. 21, 2019

(51) Int. Cl.
| | |
|---|---|
| *F01D 5/28* | (2006.01) |
| *B29C 33/12* | (2006.01) |
| *B29C 70/44* | (2006.01) |
| *B29C 70/68* | (2006.01) |
| *B29L 31/08* | (2006.01) |

(Continued)

(52) U.S. Cl.
CPC .............. *F01D 5/288* (2013.01); *B29C 33/12* (2013.01); *B29C 70/342* (2013.01); *B29C 70/44* (2013.01); *B29C 70/541* (2013.01); *B29C 70/682* (2013.01); *B64C 27/48* (2013.01); *B29L 2031/08* (2013.01); *B32B 2603/00* (2013.01);

(Continued)

(58) Field of Classification Search
CPC ... B29C 66/81455; B29C 33/12; B29C 33/14; B29C 65/48; B29C 65/483; B29C 65/4835; B29C 65/5057; B29C 70/342; B29C 70/44; B29C 70/541; B29C 70/68; B29C 70/682; B29D 99/0025; B29L 2031/08; B29L 2031/082; B32B 37/1018; B32B 2037/1253; B32B 2603/00; B64C 27/48; F01D 5/147; F01D 5/282; F01D 5/288; F05D 2220/32; F05D 2230/20; F05D 2230/23; F05D 2230/40; Y02T 50/60; B23P 15/04
See application file for complete search history.

(56) References Cited

U.S. PATENT DOCUMENTS

| | | | |
|---|---|---|---|
| 3,736,638 A | | 6/1973 | Stone |
| 4,251,309 A | * | 2/1981 | Class .................... B29C 70/342 |
| | | | 156/173 |

(Continued)

FOREIGN PATENT DOCUMENTS

| | | |
|---|---|---|
| EP | 0468221 | 1/1992 |
| FR | 3014007 | 6/2015 |

OTHER PUBLICATIONS

European Patent Office, European Search Report dated Oct. 28, 2019 in Application No. 19174762.5.

*Primary Examiner* — Michael A Tolin
(74) *Attorney, Agent, or Firm* — Snell & Wilmer L.L.P.

(57) ABSTRACT

An airfoil bonding system may comprise a mold tool configured to support an airfoil assembly during a bonding process. The bonding process may include applying heat and pressure to the airfoil assembly. A surface of the mold tool may complement a preselected airfoil parameter. The mold tool may maintain the airfoil assembly in the preselected airfoil parameter during the application of heat and pressure to the airfoil assembly.

5 Claims, 9 Drawing Sheets

(51) Int. Cl.
  *B29C 70/34* (2006.01)
  *B29C 70/54* (2006.01)
  *B64C 27/48* (2006.01)

(52) U.S. Cl.
  CPC ...... *F05D 2220/32* (2013.01); *F05D 2230/23* (2013.01); *F05D 2230/40* (2013.01)

(56) References Cited

U.S. PATENT DOCUMENTS

| | | | | |
|---|---|---|---|---|
| 4,594,761 | A * | 6/1986 | Murphy | B23P 15/04 |
| | | | | 29/418 |
| 5,238,387 | A * | 8/1993 | Hama | B29C 51/34 |
| | | | | 425/388 |
| 5,375,978 | A * | 12/1994 | Evans | B64C 11/26 |
| | | | | 416/224 |
| 6,843,565 | B2 * | 1/2005 | Evans | B29C 70/541 |
| | | | | 353/28 |
| 8,192,574 | B1 * | 6/2012 | Boone | B29C 66/1122 |
| | | | | 156/104 |
| 8,251,664 | B2 | 8/2012 | Schreiber | |
| 8,777,577 | B2 | 7/2014 | Schreiber | |
| 8,840,750 | B2 | 9/2014 | Parkin | |
| 8,906,181 | B2 | 12/2014 | Hansen, Sr. et al. | |
| 9,126,361 | B2 | 9/2015 | Schreiber | |
| 9,296,072 | B2 | 3/2016 | Dambrine et al. | |
| 9,381,699 | B2 | 7/2016 | Boschet et al. | |
| 2011/0194941 | A1 | 8/2011 | Parkin et al. | |
| 2013/0309096 | A1 * | 11/2013 | Le Bras | B29D 99/0025 |
| | | | | 416/229 A |

\* cited by examiner

MOLD TOOL AND METHODS FOR AIRFOIL BONDING

FIELD

The present disclosure relates generally to gas turbine engines, and more specifically, to a tool and method for forming airfoils.

BACKGROUND

A gas turbine engine typically includes a fan section, a compressor section, a combustor section, and a turbine section. The fan section may drive air along a bypass flowpath while the compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

The fan section, compressor section, and turbine section typically include a series of rotor systems. The rotor systems typically include a disk and a plurality of circumferentially spaced blades. The blades may include a blade body having one or more component(s), for example, a sheath and/or a cover, adhesively bonded thereto. Current systems and methods for bonding blade components may include placing the parts to be bonded within a vacuum bag with the parts in a free, unrestrained state. Such systems and methods tend to rely on uniform bond pressure from an autoclave to create the final assembly geometry. Such approaches may lead to increased variability in the final bonded product.

SUMMARY

An airfoil bonding system is disclosed herein. In accordance with various embodiments, the airfoil bonding system may comprise a mold tool configured to support an airfoil assembly during a bonding process. The boding process may comprise an application of heat and pressure to the airfoil assembly. A surface of the mold tool may complement a preselected airfoil parameter.

In various embodiments, the preselected airfoil parameter may comprise at least one of a camber, a twist, a leading edge angle, a trailing edge angle, an overall airfoil angle, or an attack angle.

In various embodiments, a vacuum sealing sheet may be configured to cover the airfoil assembly. A sealing member may be configured to form an airtight seal between the vacuum sealing sheet and the mold tool.

In various embodiments, the airfoil assembly may comprise a body, at least one of a sheath or a cover, and an adhesive located between the body and the at least one of the sheath or the cover. In various embodiments, the mold tool may be configured to maintain the airfoil assembly in the preselected airfoil parameter during a curing of the adhesive.

In various embodiments, the mold tool may define a hub groove configured to receive a hub of the airfoil assembly. The hub groove may be configured to align the airfoil assembly within the mold tool. In various embodiments, preselected airfoil parameter may comprise a camber of the airfoil assembly, and the camber of the airfoil assembly may corresponds to a preselected flow capacity of the airfoil assembly.

A mold tool for supporting an airfoil assembly during a bonding process is also disclosed herein. In accordance with various embodiments, the mold tool may comprise a surface configured to contact the airfoil assembly. The surface may complement a preselected airfoil parameter.

In various embodiments, the airfoil assembly may comprise a body, at least one of a sheath or a cover, and an adhesive located between the body and the at least one of the sheath or the cover. The mold tool may be configured to maintain the airfoil assembly in the preselected airfoil parameter during a curing of the adhesive.

In various embodiments, the surface may define a hub groove configured to receive a hub of the airfoil assembly. In various embodiments, the preselected airfoil parameter may comprise at least one of a camber, a twist, a leading edge angle, a trailing edge angle, an overall airfoil angle, or an attack angle. In various embodiments, the preselected airfoil parameter may correspond to a preselected flow capacity of the airfoil assembly.

A method for bonding components of an airfoil assembly is also disclosed herein. In accordance with various embodiments, the method may comprise disposing the airfoil assembly on a mold tool, and applying heat and pressure to the airfoil assembly to bond a first component of the airfoil assembly to a second component of the airfoil assembly. A surface of the mold tool may complement a preselected airfoil parameter.

In various embodiments, the mold tool may maintain the airfoil assembly in the preselected airfoil parameter during the applying heat and pressure to the airfoil assembly. In various embodiments, the step of applying heat and pressure to the airfoil assembly may cause a body of the airfoil assembly to form to the preselected airfoil parameter.

In various embodiments, the step of applying heat and pressure to the airfoil assembly may comprise disposing a vacuum sealing sheet over the airfoil assembly, forming an airtight seal between the vacuum sealing sheet and the mold tool; and disposing the airfoil assembly and mold tool in an autoclave. In various embodiments, the step of forming the airtight seal may comprise disposing a sealing member around an edge of the vacuum sealing sheet, and evacuating air from between the vacuum sealing sheet and the mold tool.

In various embodiments, the step of applying heat and pressure to the airfoil assembly may comprise disposing the mold tool and airfoil assembly within a heat press.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not be necessarily be repeated herein for the sake of clarity.

Figure 1:
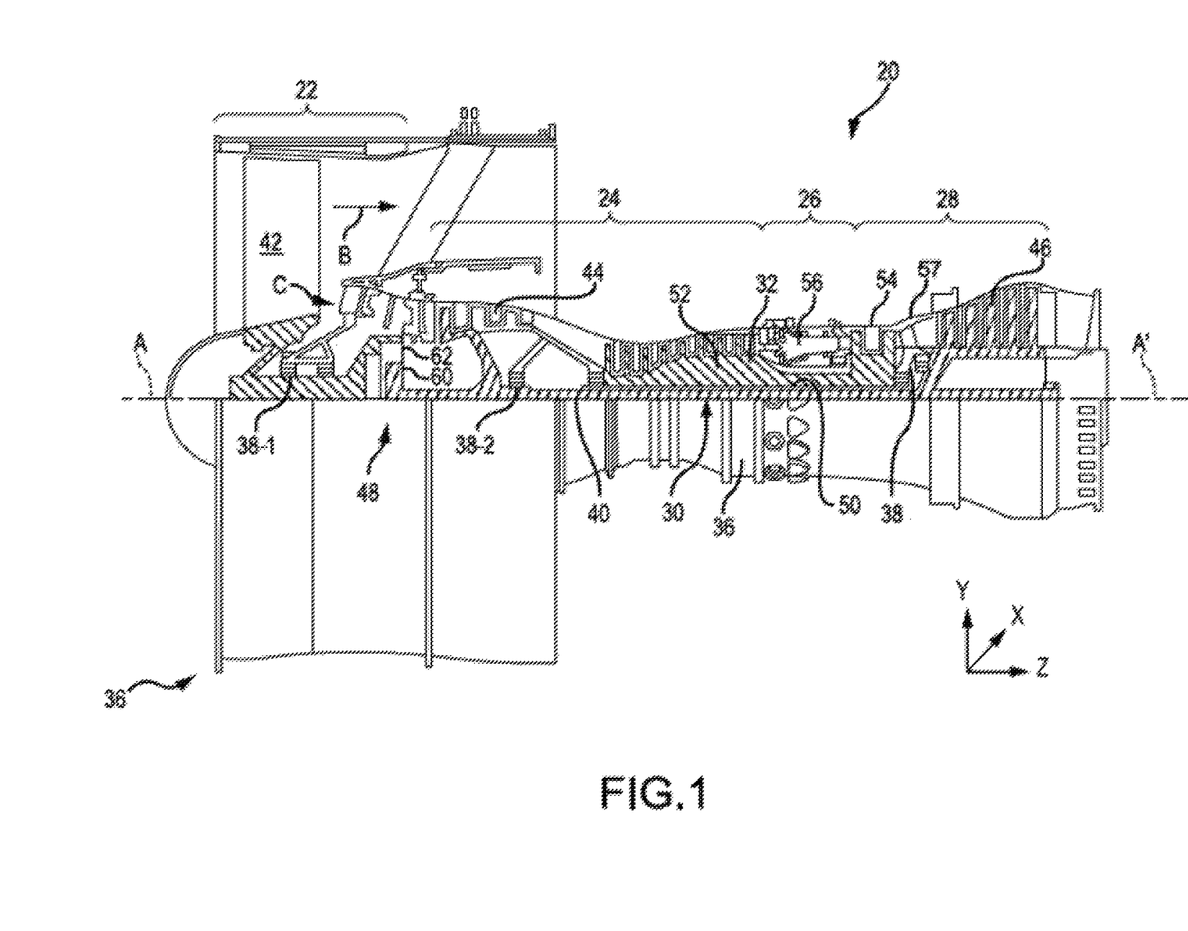
FIG. 1 illustrates a gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26, and a turbine section 28. Alternative engines may include, for example, an augmentor section among other systems or features. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including multi-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction (axial direction) on the provided xyz axes. The y direction on the provided xyz axes refers to radial directions and the x direction on the provided xyz axes refers to the circumferential direction. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and a high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 and then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Airfoils, such as rotor blades and stator vanes, are often utilized in various sections of gas turbine engines to direct, condition, and affect the flow of fluids (e.g., air and/or combustion gases) through the gas turbine engine. Some airfoils, such as fan blades, often include one or more components (e.g., sheaths and/or covers) bonded to the body of the airfoil.

Current systems and methods for bonding the airfoil components may include placing the parts to be bonded within a vacuum bag with the parts in a free state. Such systems and methods tend to produce airfoil assemblies of increased variability. For example, variability during bonding may alter the camber of the airfoil assemblies. Variability in the camber or other airfoil parameters (e.g., leading edge angle, trailing edge angle, etc.) may lead to variations in the flow characteristics and flow capacity of the airfoil assembly. Airfoil assemblies that do not meet flow capacity requirements may be discarded, which tends to increase material waste and cost. Accordingly, disclosed herein is a mold tool configured to aid alignment of airfoil components during the adhesive bonding process. In various embodiments, the mold tool may include a surface having an idealized geometry intended to produce an idealized airfoil assembly geometry with idealized flowpath surface inflections (e.g., camber, twist, attack angle, leading edge angle, trailing edge angle, angle of incidence, etc.) after curing of the adhesives. The mold tool may be used during the bonding and curing process, wherein the airfoil assembly is subjected to elevated temperatures and high pressures to cure the adhesives. The mold tool is configured to maintain the airfoil assembly in the desired geometry. Accordingly, bonding airfoil components using the mold tool disclosed herein may reduce assembly variation and lead to decreased post inspection fail rates.

Figure 2A:
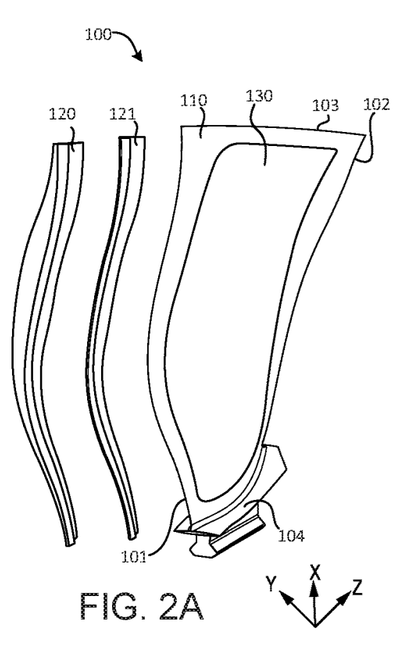
FIGS. 2A and 2B illustrate an assembly view and a perspective view, respectively, of an airfoil assembly, in accordance with various embodiments.
Figure 2B:
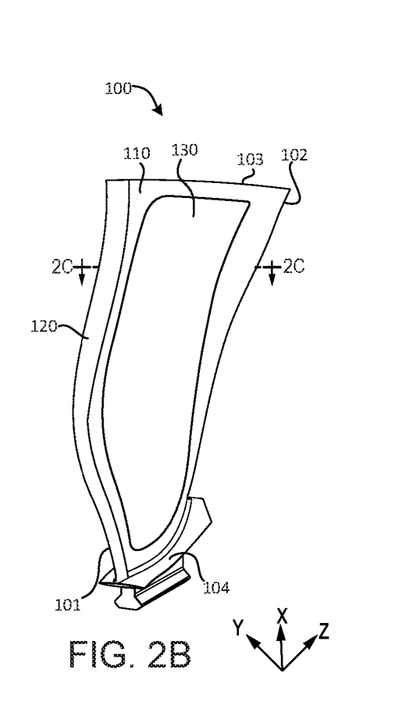

With reference to FIGS. 2A and 2B, an airfoil assembly 100 is disclosed, in accordance with various embodiments. The airfoil assembly 100 may include a hub end 104 for attaching the airfoil assembly 100 to a disk of a rotor system. The airfoil assembly 100 comprises a radially outer edge or tip 103 located radially outward from the hub end 104. The airfoil assembly 100 may have a leading edge 101 opposite a trailing edge 102. In various embodiments, the airfoil assembly 100 may further include a generally concave pressure surface and a generally convex suction surface joined together at the respective leading edge 101 and trailing edge 102. The airfoil assembly 100 may be curved and twisted relative to, for example, a plane extending radially from hub end 104. For example, airfoil assembly 100 may curve into or out of the xy plane, the xz plane, and/or the zy plane, and for example, may twist relative to the x axis, y axis and/or z axis.

It will be noted that airfoils for gas turbine engines may be provided in the variety of sizes, shapes, and geometries. Accordingly, the airfoil assembly 100 of the present disclosure is not limited to the specific geometry, size, and shape shown in the figures. Further, as mentioned above, the disclosed airfoil assembly 100 is not necessarily limited to the fan section 22 of a gas turbine engine 20, but instead may be implemented in other sections of the gas turbine engine 20 and/or may be adapted for use in other types of jet engines, propellers, rotors, etc.

Airfoil assembly 100 includes a body 110. In various embodiments, the body 110 of the airfoil assembly 100 may be fabricated from a metallic material, such as a metal and/or a metal alloy. In various embodiments, for example, the body 110 of the airfoil assembly 100 may be fabricated from aluminum, an aluminum alloy, titanium, and/or a titanium alloy, among other suitable metallic materials.

In accordance with various embodiments, the airfoil assembly 100 may include a sheath 120 coupled to the body 110, at the leading edge 101 of airfoil assembly 100. The sheath 120 may prevent excessive damage to the airfoil assembly 100 in the event of a bird strike or other foreign matter. In various embodiments, the sheath 120 may be fabricated from a metallic material, such as a metal and/or a metal alloy. In various embodiments, the sheath 120 may be fabricated from, for example, titanium and/or a titanium alloy, among other suitable metallic materials. In various embodiments, one or both of the body 110 and the sheath 120 may be made from composite materials. In various embodiments, the sheath 120 may be coupled to the body 110 using an adhesive 121. For example, the adhesive 121 may be an epoxy adhesive or a urethane adhesive. In various embodiments, the adhesive 121 may comprise, for example, one or more epoxies, bismalemides, cyanate esters, urethane-based adhesives, polyurethanes, silicones, or polyimides, and may be a supported or unsupported film and/or paste.

In accordance with various embodiments, a cover 130 may be attached to the body 110. In various embodiments, the cover 130 may be fabricated from a metallic material, such as a metal and/or a metal alloy. In various embodiments, the cover 130 may be fabricated from a composite material such as carbon fiber, fiber-reinforced polymer (e.g., fiber glass), para-aramid fiber, and/or aramid fiber. In various embodiments, the cover 130 may be fabricated from a fiber metal laminate ("FML"). For example, the cover 130 may include metal layers comprising titanium and/or a titanium alloy and the composite material layers in the FML may comprise carbon fiber, such as graphite fiber. In various embodiments, in which an FML comprises metal layers comprising aluminum and/or an aluminum alloy, the composite material layers in the FML may comprise fiber-reinforced polymer (e.g., fiber glass), para-aramid fiber, and/or aramid fiber. Though FMLs described above include specific examples of metals, metal alloys, and/or composite materials, it would not be outside the scope of this disclosure to include any FML comprising any metal, metal alloy, and/or composite material, in any arrangement of layers.

Figure 2C:
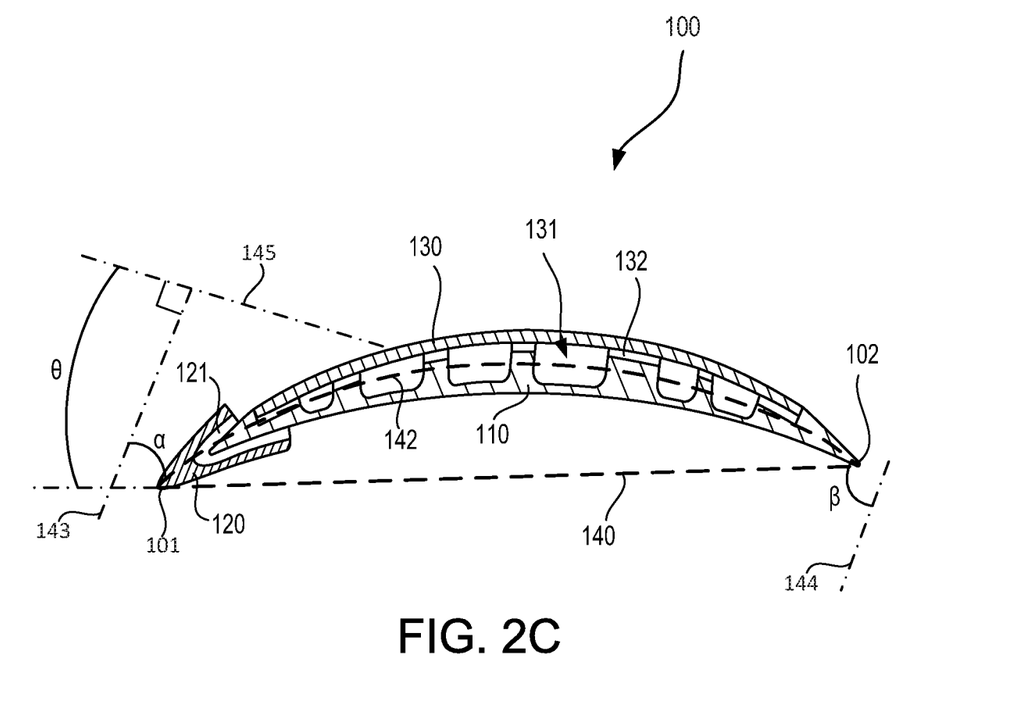
FIG. 2C illustrates of a cross-sectional view of an airfoil assembly taken along the line 2C-2C in FIG. 2B, in accordance with various embodiments.

With reference to FIG. 2C and in accordance with various embodiments, the cover 130 may be located over cavities or channels 131 defined, at least in part, by the body 110. Channels 131 may reduce a weight and/or aid in cooling the airfoil assembly 100. The cover 130 may be coupled to the body 110 using an adhesive 132. For example, the adhesive 132 may be an epoxy adhesive or a urethane adhesive. In various embodiments, the adhesive 132 may comprise, for example, one or more epoxies, bismalemides, cyanate esters, urethane-based adhesives, polyurethanes, silicones, or polyimides, and may be a supported or unsupported film and/or paste.

Airfoil assembly 100 comprises a chord 140. Chord 140 comprises an imaginary linear line extending from leading edge 101 to trailing edge 102. Airfoil assembly 100 comprises a mean camber line 142. Mean camber line 142 comprises an imaginary line extending from leading edge 101 to trailing edge 102 and located midway between the pressure surface and suction surface of airfoil assembly 100. Mean camber line 142 represents the camber of airfoil assembly 100. Airfoil assembly 100 further comprises a leading edge angle alpha ($\alpha$), a trailing edge angle beta ($\beta$), and an overall airfoil angle theta ($\theta$). Angle $\alpha$ represents the angle formed by the mean camber line 142 at leading edge 101 and a plane 143. In various embodiments, plane 143 is normal to engine central longitudinal axis A-A', with momentary reference to FIG. 1. Angle $\beta$ represents the angle formed by the mean camber line 142 at trailing edge 102 and a plane 144. Plane 144 is parallel to plane 143, and normal to engine central longitudinal axis A-A', with momentary reference to FIG. 1. Angle $\theta$ represents the angle formed by chord 140 and a plane 145. Plane 145 is normal to plane 143.

The parameters of airfoil assembly 100 (e.g., the camber, leading edge angle, trailing edge angle, overall angle, twist, attack angle, angle of incidence, etc.) are selected, or designed, according to desired airfoil operating characteristics. In this regard, airfoil assembly 100 comprises one or more preselected airfoil parameters. For example, the camber and the overall airfoil angle $\theta$ of airfoil assembly 100 may be selected to maximize flow capacity and/or produce a particular flow capacity, and the attack angle of airfoil assembly 100 (i.e., the angle of airfoil assembly 100 relative to the direction of airflow at the inlet of the rotor system) may be selected to improve flutter margin and/or produce a particular flutter margin.

Figure 3A:
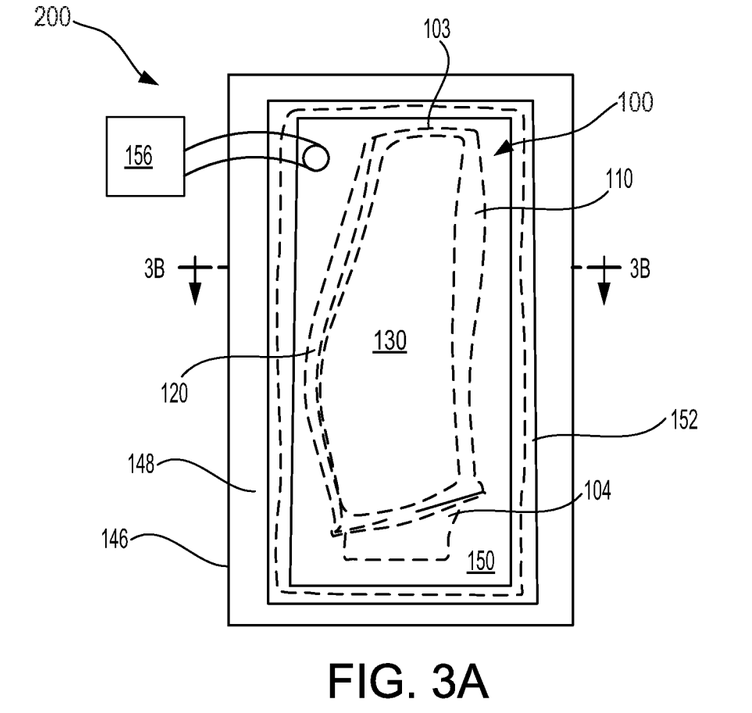
FIG. 3A illustrates a plan view of an airfoil assembly in an airfoil bonding system, in accordance with various embodiments.
Figure 3B:
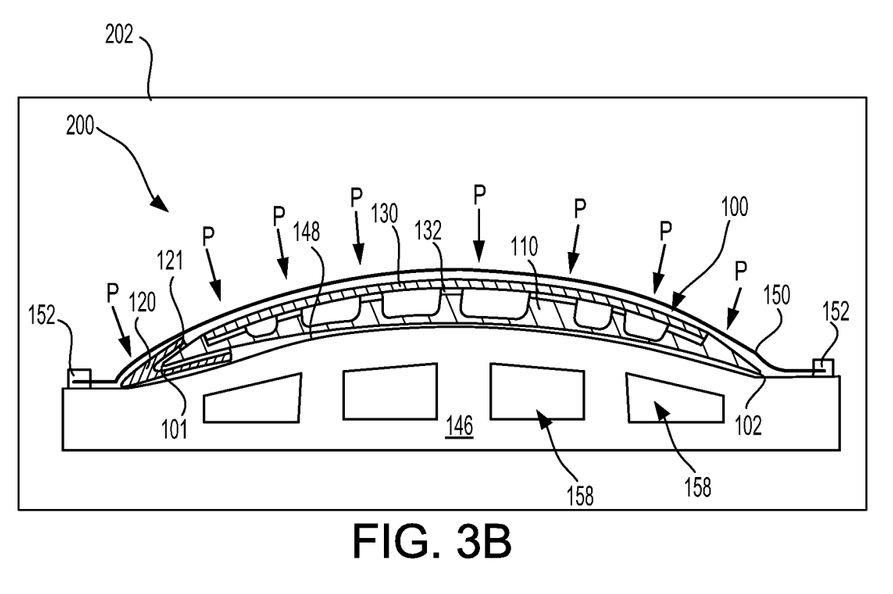
FIG. 3B illustrates a cross-sectional view of an airfoil assembly in an airfoil bonding system taken along the line 3B-3B in FIG. 3A, in accordance with various embodiments.

With reference to FIGS. 3A and 3B, an airfoil bonding system 200 is illustrated, in accordance with various embodiments. Airfoil bonding system 200 may include a mold tool 146. Mold tool 146 may be configured to receive and support airfoil assembly 100 during the bonding of sheath 120 and cover 130 to body 110. Stated differently, mold tool 146 may be configured to receive and support airfoil assembly 100 during the curing of adhesives 121 and 132. Mold tool 146 may be formed or fabricated using metal, metal alloy, thermoplastic, fiber or particle reinforced composite, or other material capable of withstanding the pressure applied during bonding and maintaining airfoil assembly 100 in the desired geometry. Mold tool 146 may comprise one or more cavities or orifices 158. Orifices 158 may be devoid of material and may reduce an overall weight of mold tool 146.

In various embodiments, airfoil bonding system 200 may include a vacuum sealing sheet 150 configured to cover the airfoil assembly 100. Vacuum sealing sheet 150 may be coupled to the mold tool 146. For example, in various embodiments, a sealing member 152 may be located around the perimeter of vacuum sealing sheet 150 and may form an airtight seal between vacuum sealing sheet 150 and mold tool 146. Sealing member 152 may comprise a tape, clamp, frame, clip, or other structure capable of forming an airtight seal around airfoil assembly 100. A vacuum 156 may be coupled to mold tool 146. Vacuum 156 may be configured to evacuate the air from between mold tool 146 and vacuum sealing sheet 150.

In various embodiments, the bonding of sheath 120 and cover 130 to body 110 may be accomplished by curing adhesives 121 and 132. Adhesives 121 and 132 may be cured by applying a combination of pressure P and heat to airfoil assembly 100. For example, in various embodiments, after securing vacuum sealing sheet 150, mold tool 146 and airfoil assembly 100 may be placed in an autoclave 202 and subjected to increased pressure P and heat to cure adhesives 121 and 132. Mold tool 146 may maintain airfoil assembly 100 in the preselected airfoil geometry during the curing process. In this regard, a surface 148 of mold tool 146 may be configured to complement, or mirror, a desired or preselected airfoil parameter (e.g., a camber, twist, attack angle, leading edge angle, trailing edge angle, angle of incidence, etc. of airfoil assembly 100). In various embodiments, the preselected airfoil parameter may correspond to a particular airfoil operating characteristic. For example, surface 148 may maintain the camber of airfoil assembly 100 to ensure that, after curing, airfoil assembly 100 will exhibit a desired flow capacity.

While FIG. 3B illustrates use of an autoclave 202 to cure adhesives 121 and 132, it should be understood that mold tool 146 may be used with any apparatus capable of applying pressure and heat to airfoil assembly 100. For example, in various embodiments and with reference to FIG. 3D, adhesives 121 and 132 may be cured by disposing mold tool 146 and airfoil assembly 100 in a heat press 204. Stated differently, sheath 120 and cover 130 may be bonded to body 110 by disposing mold tool 146 and airfoil assembly 100 in heat press 204. Heat press 204 is configured to apply heat and pressure P to airfoil assembly 100 to cure adhesives 121 and 132, thereby bonding sheath 120 and cover 130 to body 110.

Figure 3C:
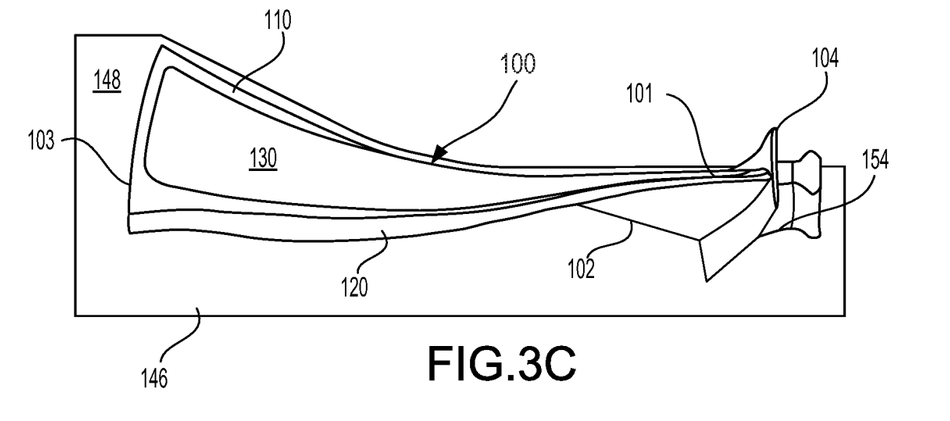
FIG. 3C illustrates a side view of an airfoil assembly in an airfoil bonding system, in accordance with various embodiments.

With reference to FIG. 3C, in various embodiments, surface 148 of mold tool 146 may be configured to complement, or mirror, the desired twist, attack angle, leading and trailing edge angles, angle of incidence, or other flowpath surface inflection of airfoil assembly 100, during the cure of adhesives 121 and 132 (i.e. during an application of heat and pressure to airfoil assembly 100). Surface 148 may define a hub groove 154. Hub groove 154 is configured to receive hub end 104 of airfoil assembly 100. In this regard, hub groove 154 complements, or mirrors, the shape and geometry of hub end 104. Hub groove 154 may be used to align airfoil assembly 100 within the mold tool 146. Locating hub end 104 within hub groove 154 may ensure airfoil assembly 100 is in the proper axial and radial location on surface 148 of mold tool 146.

Figure 4A:
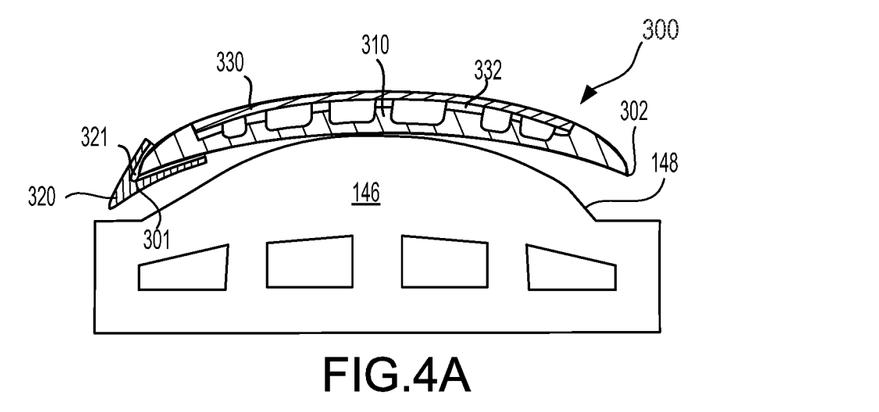
FIGS. 4A, 4B, 4C, and 4D illustrate an airfoil bonding system shaping an airfoil assembly to reduce variation in the geometry of the airfoil assembly, in accordance with various embodiments.

In various embodiments, mold tool 146 may be employed to shape one or more components of the airfoil assembly, in addition to maintaining the airfoil assembly geometry, during the curing process. For example and with reference to FIG. 4A, an airfoil assembly 300 comprising an under camber geometry prior to curing is illustrated. Airfoil assembly 300 is similar to airfoil assembly 100 in FIGS. 2B and 2C, and includes a body 310, a sheath 320, a cover 330, an adhesive 321 configured to bond sheath 320 to body 310, and an adhesive 332 configured to bond cover 330 to body 310. Prior to curing adhesives 321 and 332, airfoil assembly 300 may not comprise the desired airfoil geometry and/or flowpath surface inflections. In this regard, portions of airfoil assembly 300 (e.g., trailing edge 302, leading edge 301, and sheath 320) may not be in contact with surface 148 of mold tool 146.

Figure 4B:
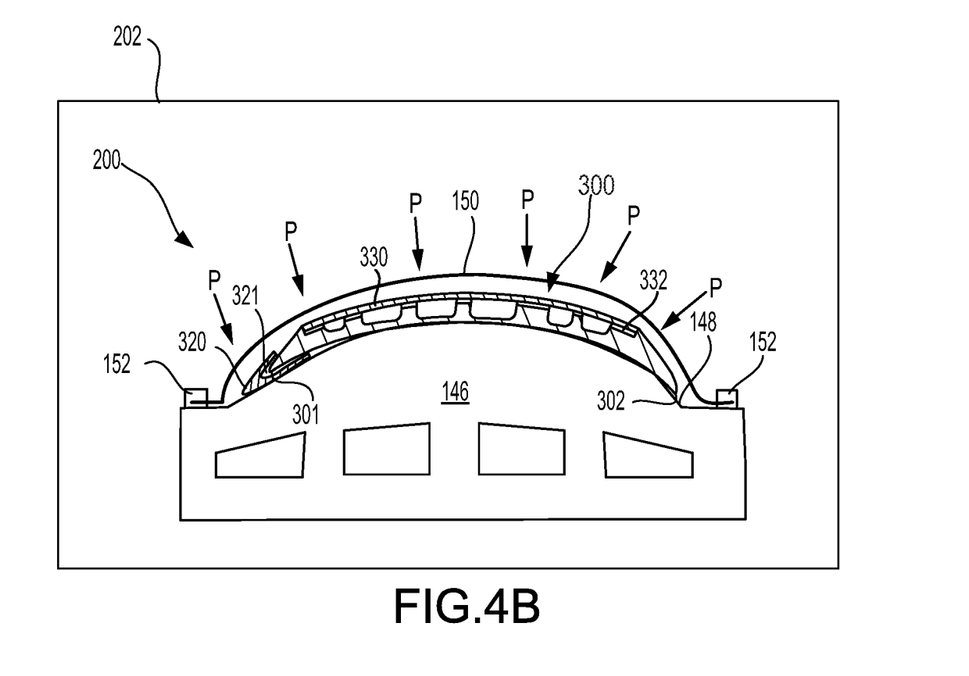

With reference to FIG. 4B, during the cure of adhesives 321 and 332 (i.e., when bonding sheath 320 and cover 330 to body 310), the application of heat and pressure P may cause airfoil assembly 300 to form to surface 148 of mold tool 146, such that after curing adhesives 321 and 332, the shape of airfoil assembly 300 will mirror surface 148 of mold tool 146. Airfoil assembly 300 mirroring surface 148 causes airfoil assembly 300 to have one or more preselected airfoil parameters (e.g., camber, airfoil angle, attack angle, twist, etc.) and the operating characteristics associated therewith. For example, in various embodiments, the application of heat and pressure during the cure of adhesives 321 and 332, may cause body 310 to form to surface 148 of mold tool 146 such that after curing, body 310 will have a preselected camber and the flow capacity associated therewith.

Figure 4C:
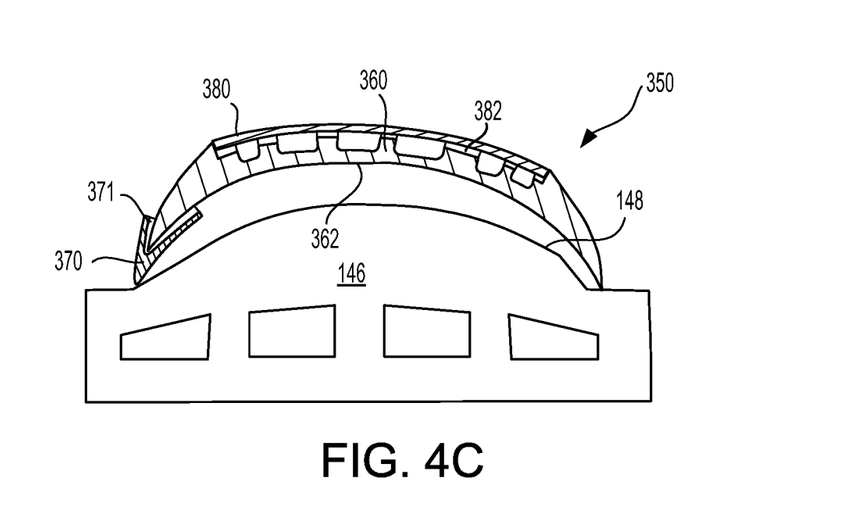

FIG. 4C illustrates an airfoil assembly 350 comprising an over camber geometry prior to curing. Airfoil assembly 350 is similar to airfoil assembly 100 in FIGS. 2B and 2C, and includes a body 360, a sheath 370, a cover 380, an adhesive 371 configured to bond sheath 370 to body 360, and an adhesive 382 configured to bond cover 380 to body 360. Prior to curing adhesives 371 and 382, airfoil assembly 350 may not comprise the desired airfoil geometry and/or flowpath surface inflections. For example, portions of airfoil assembly 300 (e.g., surface 362 of body 360) may not be in contact with surface 148 of mold tool 146.

Figure 4D:
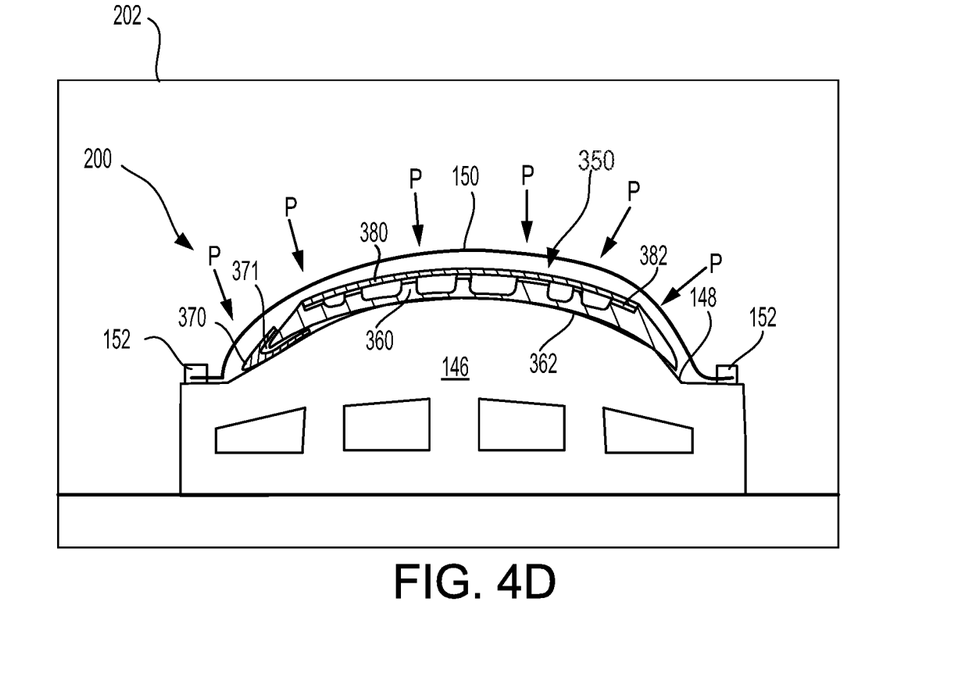

With reference to FIG. 4D, during the cure of adhesives 371 and 382 (i.e., when bonding sheath 370 and cover 380 to body 360), the application of heat and pressure P may cause airfoil assembly 350 to form to surface 148 of mold tool 146, such that after curing adhesives 371 and 382, the shape of airfoil assembly 350 will mirror surface 148 of mold tool 146. Airfoil assembly 350 mirroring surface 148 causes airfoil assembly 350 to have one or more preselected airfoil parameters (e.g., camber, twist, leading edge angle, etc.) and the operating characteristics associated therewith. For example, in various embodiments, the application of heat and pressure during the cure of adhesives 371 and 382, may cause body 360 to form to surface 148 of mold tool 146 such that after curing, body 360 will have a preselected camber and the flow capacity associated therewith.

Figure 5A:
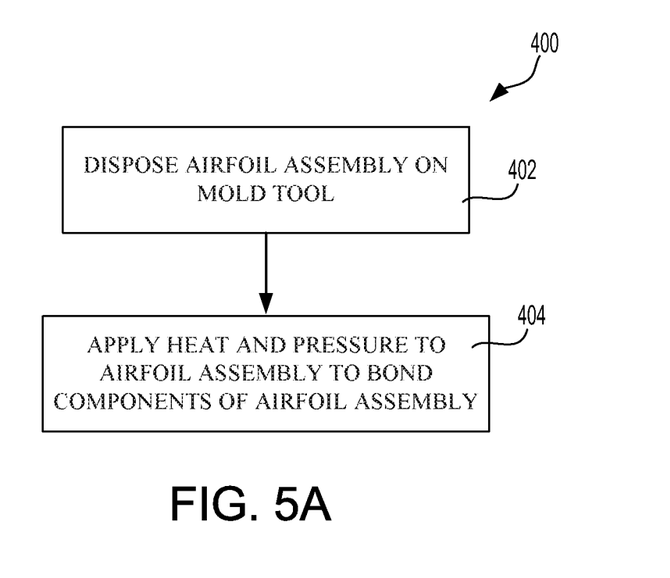
FIGS. 5A, 5B, 5C, and 5D illustrate a method for bonding an airfoil assembly, in accordance with various embodiments.

Referring to FIG. 5A, a method 400 for bonding components of an airfoil assembly is illustrated, in accordance with various embodiments. Method 400 may comprise disposing a airfoil assembly on a mold tool (step 402) and applying heat and pressure to the airfoil assembly to bond a first component of the airfoil assembly to a second component of the airfoil assembly (step 404). In various embodiments, a surface of the mold tool may complement a preselected airfoil parameter.

Figure 5B:
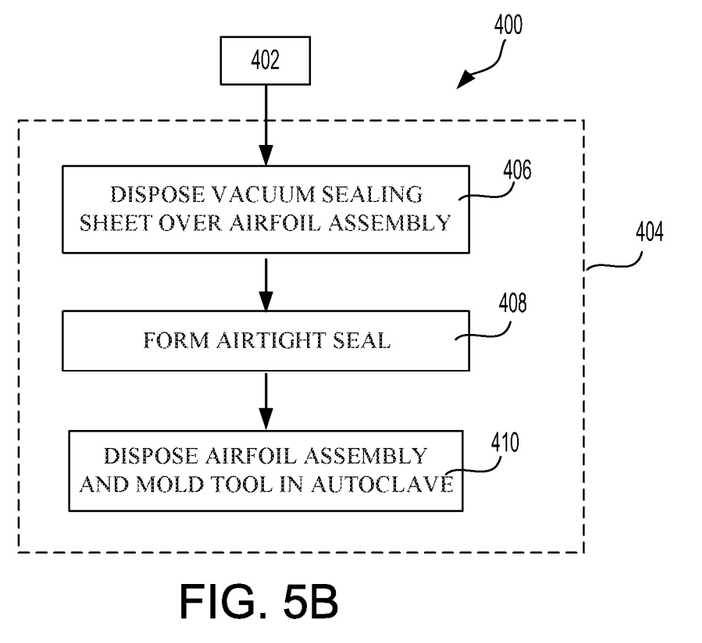

Referring to FIG. 5B, in various embodiments, step 404 may comprise disposing a vacuum sealing sheet over the airfoil assembly (step 406), forming an airtight seal between the vacuum sealing sheet and the mold tool (step 408), and disposing the airfoil assembly and mold tool in an autoclave (step 410).

Figure 5C:
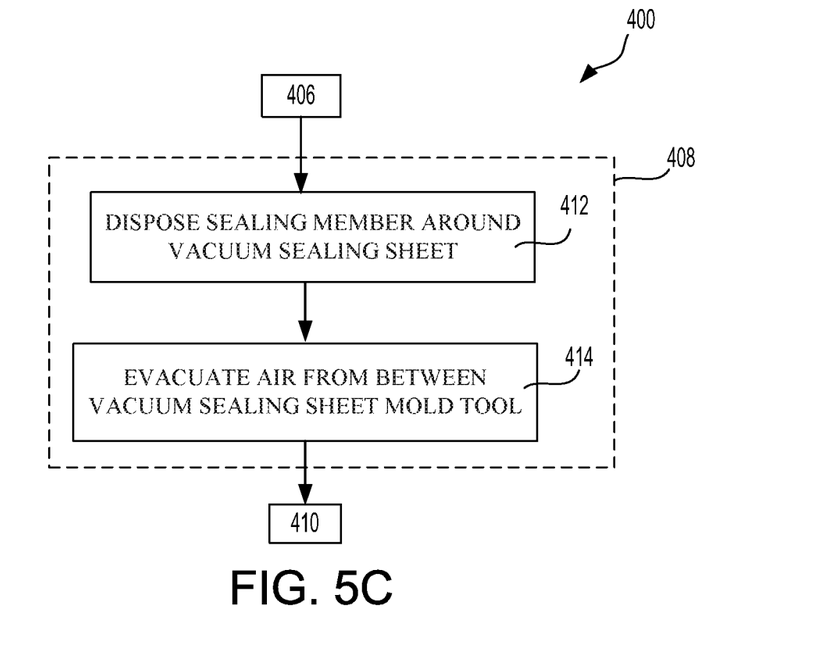

Referring to FIG. 5C, in various embodiments, step 408 may comprise disposing a sealing member around an edge of the vacuum sealing sheet (step 412), and evacuating air from between the vacuum sealing sheet and the mold tool (step 414).

Figure 5D:
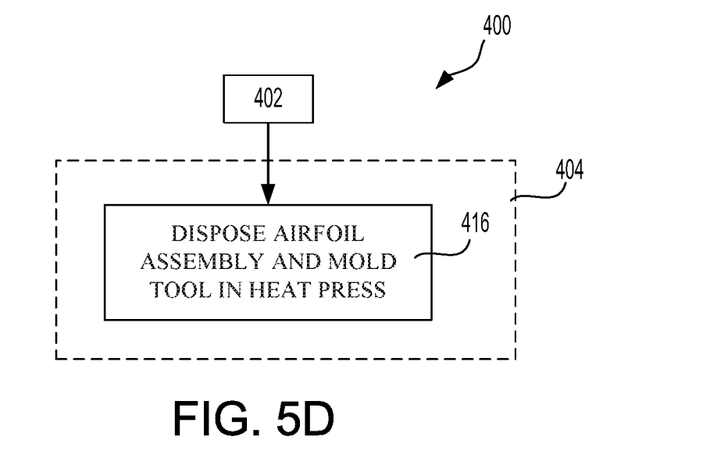

Referring to FIG. 5D, in various embodiments, step 404 may comprise disposing the airfoil assembly and mold tool in an heat press (step 416).

With combined reference to FIGS. 3B and 5A, in various embodiments, step 402 may include disposing airfoil assembly 100 on mold tool 146. Surface 148 of mold tool 146 may complement a preselected airfoil parameter. Step 404 may comprise applying heat and pressure P to airfoil assembly 100 to bond a first component (e.g., sheath 120 or cover 130) of airfoil assembly 100 to a second component (e.g., body 110) of airfoil assembly 100. (step 404).

With combined reference to FIGS. 3B and 5B, in various embodiments, step 406 may comprise disposing vacuum sealing sheet 150 over airfoil assembly 100. Step 408 include forming an airtight seal between vacuum sealing sheet 150 and mold tool 146. Step 410 may include disposing airfoil assembly 100 and mold tool 146 in autoclave 202.

With combined reference to FIGS. 3B and 5C, in various embodiments, step 412 may comprise disposing sealing member 152 around an edge of vacuum sealing sheet 150. Step 414 may include evacuating air from between vacuum sealing sheet 150 and mold tool 146. In various embodiments, vacuum 156 may be coupled to mold tool 146 to evacuate the air from between vacuum sealing sheet 150 and mold tool 146.

Figure 3D:
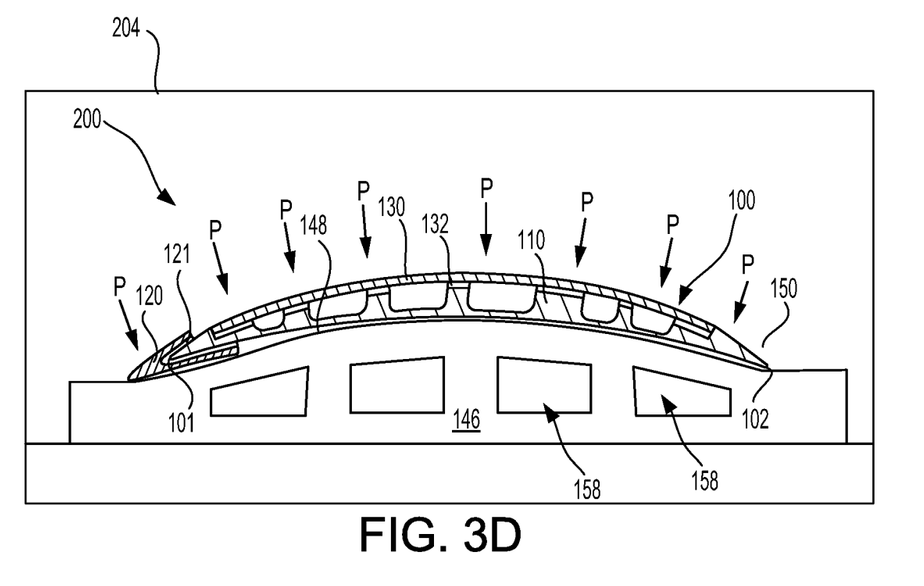
FIG. 3D illustrates an airfoil assembly and mold tool in a heat press, in accordance with various embodiments.

With combined reference to FIGS. 3D and 5D, in various embodiments, step 416 may comprise disposing airfoil assembly 100 and mold tool 146 in heat press 204. In various embodiments, mold tool 146 may maintain airfoil assembly 100 in the preselected airfoil parameter during the application of heat and pressure P (i.e., during step 404). In various embodiments, the application of heat and pressure P (step 404) may cause body 110 of airfoil assembly 100 to form to the preselected airfoil parameter.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for bonding components of an airfoil assembly, comprising:
   disposing the airfoil assembly on a mold tool, wherein a surface of the mold tool complements a preselected airfoil parameter, and wherein the surface of the mold tool defines a hub groove configured to receive a hub of the airfoil assembly, and wherein the hub groove is configured to locate the airfoil assembly in a proper axial location and a proper radial location on the surface of the mold tool;
   disposing a vacuum sealing sheet over the airfoil assembly;
   forming an airtight seal between the vacuum sealing sheet and the mold tool; and
   applying heat and pressure to the airfoil assembly to bond a first component of the airfoil assembly to a second component of the airfoil assembly; and
   wherein the airfoil assembly comprises:
      a body;
      at least one of a sheath or a cover; and
      an adhesive located between the body and the at least one of the sheath or the cover, and wherein the at least one of the sheath or the cover is the first component of the airfoil assembly, and wherein the body is the second component of the airfoil assembly.

2. The method of claim 1, wherein the mold tool maintains the airfoil assembly in the preselected airfoil parameter during the applying heat and pressure to the airfoil assembly.

3. The method of claim 1, wherein the applying heat and pressure to the airfoil assembly causes the airfoil assembly to form to the preselected airfoil parameter.

4. The method of claim 1, wherein the applying heat and pressure to the airfoil assembly comprises:
   disposing the airfoil assembly and the mold tool in an autoclave.

5. The method of claim 1, wherein the forming the airtight seal comprises:
   disposing a sealing member around an edge of the vacuum sealing sheet; and
   evacuating air from between the vacuum sealing sheet and the mold tool.

* * * * *